(12) United States Patent
Coombs

(10) Patent No.: US 6,256,285 B1
(45) Date of Patent: Jul. 3, 2001

(54) OPTICAL SCANNING DEVICE

(75) Inventor: James H. Coombs, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/184,532

(22) Filed: Nov. 2, 1998

(30) Foreign Application Priority Data

Nov. 7, 1997 (EP) .................................................. 97203460

(51) Int. Cl.$^7$ ....................................................... G11B 7/00
(52) U.S. Cl. ................................ 369/112.03; 369/112.12; 369/120
(58) Field of Search ..................................... 369/109, 103, 369/112, 120, 112.01, 112.03, 112.04, 112.11, 112.12, 112.15, 44.41

(56) References Cited

U.S. PATENT DOCUMENTS 4,665,310  5/1987  Heemskerk .
4,945,529  7/1990  Ono et al. .
5,511,057  4/1996  Holtslag et al. .

FOREIGN PATENT DOCUMENTS

WO9628816  9/1996  (WO) .

OTHER PUBLICATIONS

Neues Aus Der Technik, No. 4, Dec. 20, 1990, p. 7, Item 493.

Primary Examiner—Paul W. Huber
(74) Attorney, Agent, or Firm—Steven R. Biren

(57) ABSTRACT

An optical scanning device is described which can scan a record carrier by a radiation beam. A dividing element directs radiation reflected from the record carrier to a detection system. The detection system includes at least three detectors. The dividing element has at least three gratings, each forming a sub-beam directed to one of the detectors. The longest dimension of each detector is substantially perpendicular to the bisector of the appertaining sector.

6 Claims, 5 Drawing Sheets

OPTICAL SCANNING DEVICE

BACKGROUND OF THE INVENTION

The invention relates to a device for optically scanning an information plane, which device comprises a radiation source for supplying a scanning beam, an objective system for focusing the scanning beam to a scanning spot on the information plane, a dividing element comprising at least one sector having an included arc equal to or smaller than 120° arranged in the optical path of the radiation from the information plane for splitting at least a part of said radiation into a sub-beam, and a radiation-sensitive detection system comprising an oblong detector for receiving the sub-beam.

A sector is an area enclosed between two radii and a line connecting endpoints of the radii. The line may have any form, e.g. an arc cut off by the radii or a straight line, or a line having a 90° angle. A bisector of a sector is a straight line which bisects the included angle between the two radii of the sector in equal parts. A figure is said to be oblong when its dimensions in perpendicular directions are not equal.

A device of this type, which in principle is suitable for reading and writing information in an optical record carrier, is known from a publication in the journal Neues aus der Technik, number 4, Dec. 20, 1990, page 7, item 493. The sub-beams formed by a dividing element of the known device are incident on a detection system. The detection signals of the detection system are used for deriving a radial tracking error signals and a focus error signal. It is a disadvantage of the known device that it is less suitable for scanning multi-layer record carriers, as known from inter alia U.S. Pat. No. 5,511,057. The information planes in such a multi-layer record carrier are scanned from one side of the record carrier, i.e. one information plane is scanned through another information plane. Stray light from the other information plane affects the signals derived from the detection system. Moreover, neither is the known device suitable for scanning different types of record carriers having transparent substrate layers of different thicknesses, as is known from inter alia European patent application no. 763 236. Aberrated light rays in this applications affect the signals derived from the detection system.

SUMMARY OF THE INVENTION

It is an object of the invention to provide a device according to the preamble which is less sensitive to stray-light and aberrated light rays.

The device according to the invention is therefore characterized in that the direction of the longest dimension of the detector is substantially perpendicular to the bisector of the sector of the dividing element. The sub-beam formed by a sector forms a spot on the detector. In the geometric approximation the spot has the form of the sector. Stray-light and aberrated rays deflected by the sector form a fan of light radially extending from the centre of the sector and within the angle subtended by the sector. The detector size in the direction of the bisector determines the spatial filtering characteristics of the detector. When, according to the invention, a detector of the detection system has its largest dimension perpendicular to the direction of the bisector, the quantity of stray light or aberrated rays intercepted by the detector will be reduced. A detector is called oblong if its length is at least twice its width.

In a preferred embodiment of the device the angle between the bisector and the direction of the longest dimension is within the range from 75° to 105°, in order to reduce substantially the effect of stray light and aberrated rays.

When the wavelength of the radiation changes, e.g. because of temperature changes of the radiation source or changes in the electrical control of the radiation source, the position of the spot preferably changes in the direction of the longest dimension of the detector. The spot will then be properly detected even when the wavelength changes.

In special embodiments of the scanning device one or more detectors comprise two sub-detectors located symmetrically at both sides of a dividing line. The dividing line is preferably arranged substantially parallel to the direction of the longest dimension of the detector. A change of wavelength will cause a drift of the spot along the dividing line, not affecting the distance between the centre of gravity of the spot's intensity distribution and the dividing line.

The sectors of the dividing element are preferably provided with grating lines and the angle between the direction of the grating lines in each sector and the bisector of the sector is less than 15°. The orientation of the grating lines causes the spots formed on the detectors to have a wavelength drift in a direction substantially perpendicular to the bisector of each sector, i.e. in the direction of the longest dimension of each detector. The direction of grating lines of a grating having curved lines is understood to be the direction of the grating lines averaged over the grating.

The width of a detector in the direction of the bisector of the appertaining sector is preferably in a range from 4 to 8 times $\lambda/NA$, where $\lambda$ is the wavelength of the radiation and NA is the numerical aperture of the beam incident on the detector. A smaller detector affects the quality of the signals derived from the detector output signals, whereas a wider detector captures too much stray light and aberrated rays.

The number of sectors in the dividing element is preferably equal to or larger than two. More preferably, the number of sectors is equal to four, which allows the generation of a focus error signal using the Foucault method, as known from inter alia U.S. Pat. No. 4,665,310. The dividing element may comprise e.g. one 180° sector and two 90° sectors, four 90° sectors, or three 120° sectors.

BRIEF DESCRIPTION OF THE DRAWINGS

The objects, features and advantages of the invention will be apparent from the following more particular description of preferred embodiments of the invention, as illustrated in the accompanying drawings.

DESCRIPTION OF THE PREFERRED EMBODIMENTS

Figure 1A:
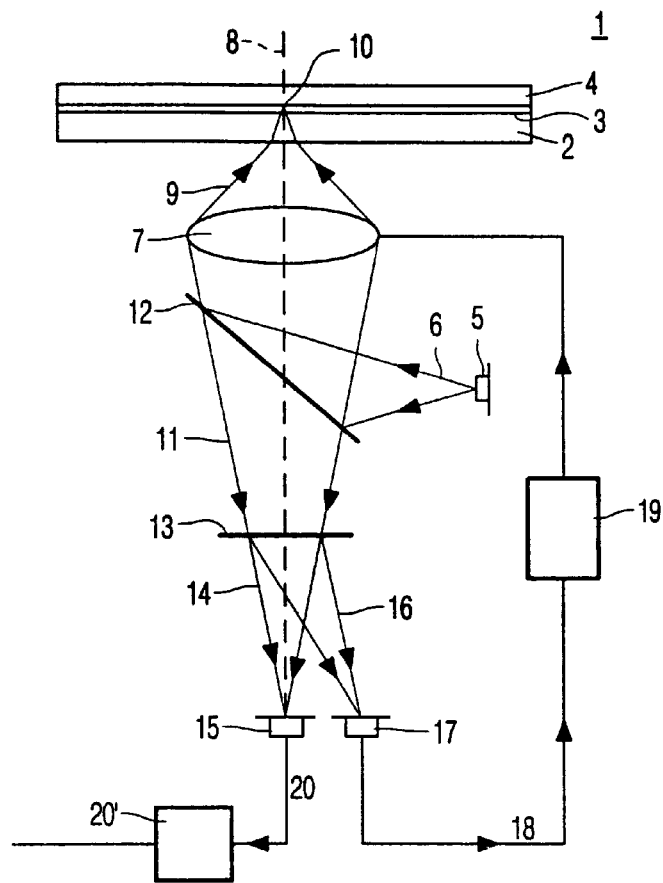
FIGS. 1A and B show scanning devices according to the invention.

FIG. 1A shows a device for scanning an optical record carrier 1. The record carrier comprises a transparent layer 2, on one side of which an information layer 3 is arranged. The side of the information layer facing away from the transparent layer is protected from environmental influences by a protection layer 4. Transparent layer 2 acts as a substrate for the record carrier by providing mechanical support for the information layer. Alternatively, the transparent layer may have the sole function of protecting the information layer, while the mechanical support is provided by a layer on the other side of the information layer, for instance by protection layer 4. Information can be stored in the record carrier in the form of optically detectable marks arranged in substantially parallel tracks, not indicated in the Figure. The marks may be in the form of pits, areas with a reflection coefficient or a direction of magnetization different from its surroundings, or a combination of these forms.

The scanning device comprises a radiation source 5, for instance a semiconductor laser, emitting a diverging radiation beam 6. An objective lens 7 having an optical axis 8 transforms radiation beam 6 to a converging beam 9 which forms a focal spot 10 on information layer 3. Although the objective lens is indicated in the Figure as a single lens element, it may also comprise a combination of a collimator lens and an objective lens, a hologram operating in transmission or reflection, or a grating for coupling radiation out of a waveguide carrying the radiation beam. Radiation of converging beam 9 reflected by information layer 3, forming a reflected beam 11, returns on the optical path of the forward converging beam 9. After objective lens 7 the reflected beam passes through a beam splitter 12, for instance a semi-transparent plate, and a dividing element 13. The dividing element may be a diffractive plate divided into four sectors. A zero-order beam 14 formed by the dividing element is incident on a quadrant detector 15. Four higher-order beams 16 formed by the dividing element, indicated in the Figure as a single beam, are incident on a detection system 17. The beams 16 are preferably first-order beams. Detection system 17 generates focus and radial tracking error signals 18. The error signals are used as input for a servo controller 19, which controls the axial and radial position of objective lens 7, thereby controlling the axial and radial position of focal spot 10. The focus error signal may be formed by the Foucault or beam-size method. The value of the focus error signal represents the axial difference in height between focal spot 10 and the information layer 3. The radial tracking error signal may be formed by the push-pull or differential phase-detection method. The part of the detection system used for generating the error signals is called the error detection system. The servo system for positioning the objective lens comprises the error detection system, the servo controller and one or more actuators for moving the objective lens.

The sum of the output signals of quadrant detector 15 can be used to form an information signal 20 representing the information read from the information plane. The information signal is fed into an error-correction circuit 20', which corrects errors in the information. The output of error-correction circuit is a signal representing corrected information. The four output signals of quadrant detector 15 can also be used to form a radial tracking error signal according to the so-called differential phase detection or differential time detection method, as disclosed in inter alia U.S. Pat. No. 4,785,441, in which phases or time-delays between the high-frequency components of the output signals are determined. This generation of the radial tracking error signal requires that the quadrant detector 15 be placed in the far field of the first-order beam 94. To that end, the quadrant detector can be moved a small distance out of focus. The optimum position of quadrant detector 15 is eight focal depths away from the focal point of beam 14 towards dividing element 13. Quadrant detector 15 may also be used when aligning the components of the optical system of the scanning device.

Figure 1B:
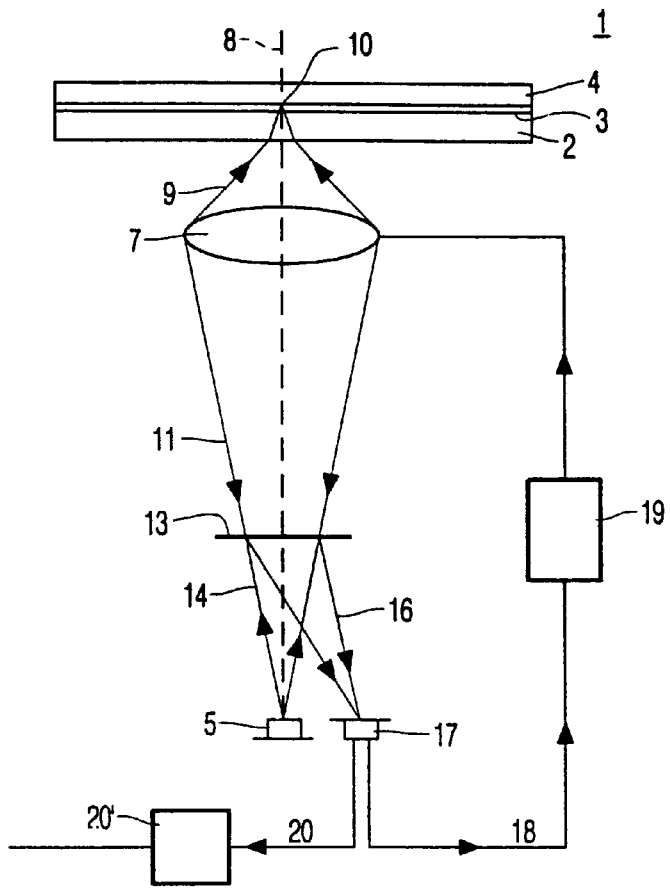

FIG. 1B shows a different embodiment of the scanning device according to the invention. Radiation source 5 is arranged on optical axis 8. The function of beam splitter 12 has been taken over by dividing element 13, so beam splitter 12 is not necessary anymore. Information signal 20' is formed from the sum of output signals of the sub-detectors in detection system 17.

Figure 2:
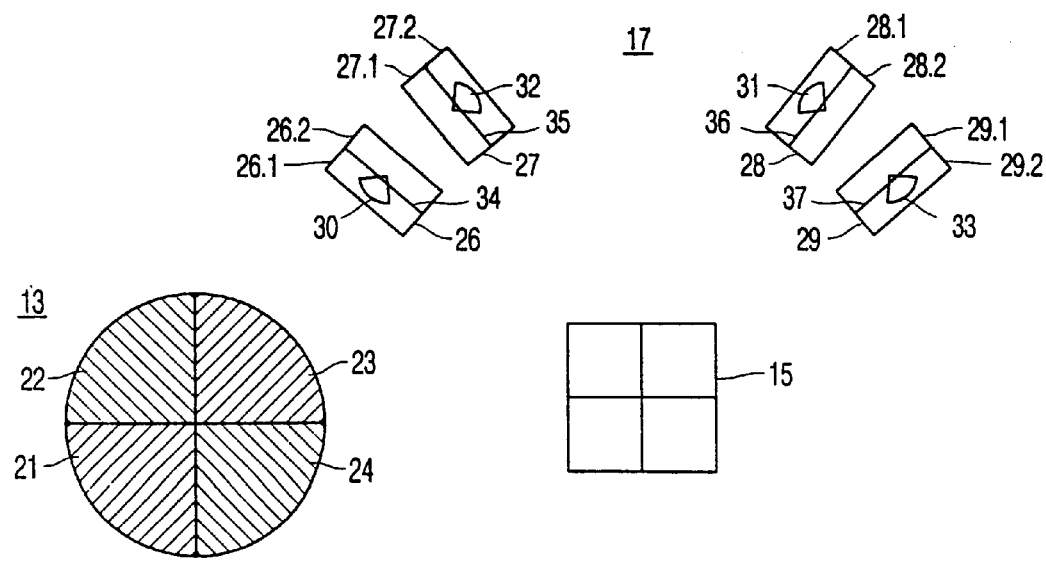
FIG. 2 shows the dividing element and the lay-out of the detection system.

FIG. 2 shows the dividing element 13, quadrant detector 15 and detection system 17 in a preferred mutual orientation. Although dividing element 13 and quadrant detector 15 are located above one another, they have been drawn sideways displaced for elucidation only. The dividing element has four quadrants 21 to 24, each provided with a grating. A quadrant is understood to be any of four parts into which a plane is divided by rectangular coordinate axes lying in that plane. The lines of a grating in a quadrant are directed along the bisector of the quadrant. The direction of the tracks on the information plane are in the horizontal direction in FIG. 2. The detection system 17 comprises four split detectors 26 to 29. Quadrant 21 diffracts light from beam 11 incident on it in a direction perpendicular to the grating lines. The beam diffracted by the quadrant forms a spot 30 on detector 26. The spot has the shape of the quadrant 21, as shown in the Figure. Likewise, quadrants 22, 23 and 24 form spots 31, 32 and 33 on detectors 28, 27 and 29 respectively. Any stray light and aberrated rays within a quadrant is centred on the quadrant bisector. Since the detector size along this direction is small, most of the stray light and aberrated rays falls beside the detector, reducing its influence on the electric signals generated by the detector. Each detector 26 to 29 is a split detector, having two sub-detectors 26.1, 26.2 to 29.1, 29.2 on both sides of a dividing line 34 to 37 respectively. A change in the wavelength of laser 5 causes a drift of the position of each spot along the dividing line.

The width of a detector in the direction of the bisector is preferably between 4 and 8 times $\lambda/NA$, where $\lambda$ is the wavelength of the radiation and NA the numerical aperture of the sub-beam incident on the detector. The length of a detector is preferably substantially equal to five times its width. In a particular embodiment having a wavelength of 780 nm and a numerical aperture of 0.08, the detector has a width of 60 $\mu$m and a length of 300 $\mu$m. A sub-detector has a width of 30 $\mu$m.

Figure 3A:
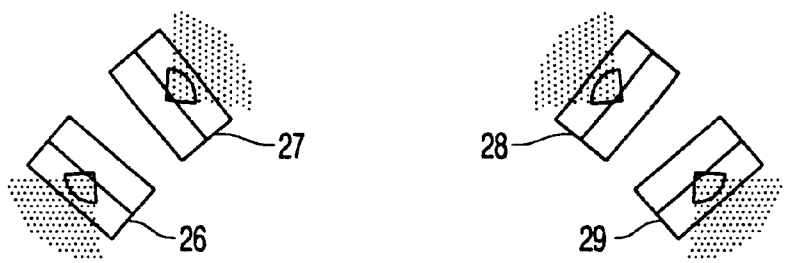
FIGS. 3A–C shows the stray light distribution on the detection system when scanning a double-layer record carrier (A, B) and a record carrier having a deviating substrate thickness (C)
Figure 3B:
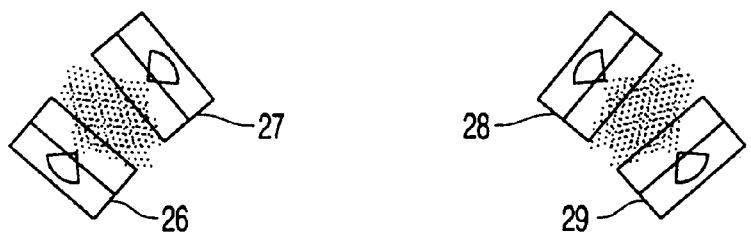
Figure 3C:
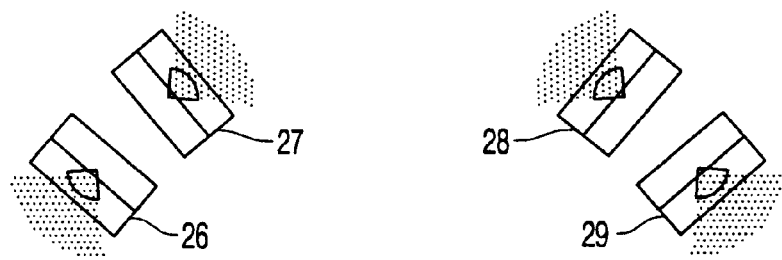

FIG. 3 shows the intensity distribution of stray light and aberrated rays on detection system 17. The drawn quadrant-shaped spot on each split detector indicates the spot formed by a sector of the dividing element, whereas the shaded spot indicates the stray light and aberrated rays. FIG. 3A shows the distribution when scanning one of the information planes of a double-layer record carrier. FIG. 3B shows the distribution when scanning the other information plane of the record carrier. Note that the distance between detectors 26 and 27 and the distance between detectors 28 and 29 must be sufficiently large to avoid that aberrated light from a sub-beam incident on one detector falls on the neighbouring detector. The distance as measured between the nearest edges of the detectors is preferably larger than twice the diameter of the spot on a detector measured in the direction of the bisector of the appertaining sector. The diameter is measured in the in-focus condition and disregarding stray light and aberrated rays. The effect on the focus error of stray light and aberrated rays falling on a neighbouring detector is reduced by the processing of the detector output signals as shown in the FIG. 4. The distribution of radiation in FIG. 3C is obtained when scanning a record carrier having a thickness of substrate 2 different from the design value. As an example, objective lens 7 may be designed for compensating the spherical aberration incurred when the radiation beam passes through a 0.6 mm thick substrate. When scanning a record carrier having a 1.2 thick substrate, the marginal rays of the radiation beam 11 will show a strong spherical aberration, resulting in a distribution such as shown in FIG. 3C.

Figure 4:
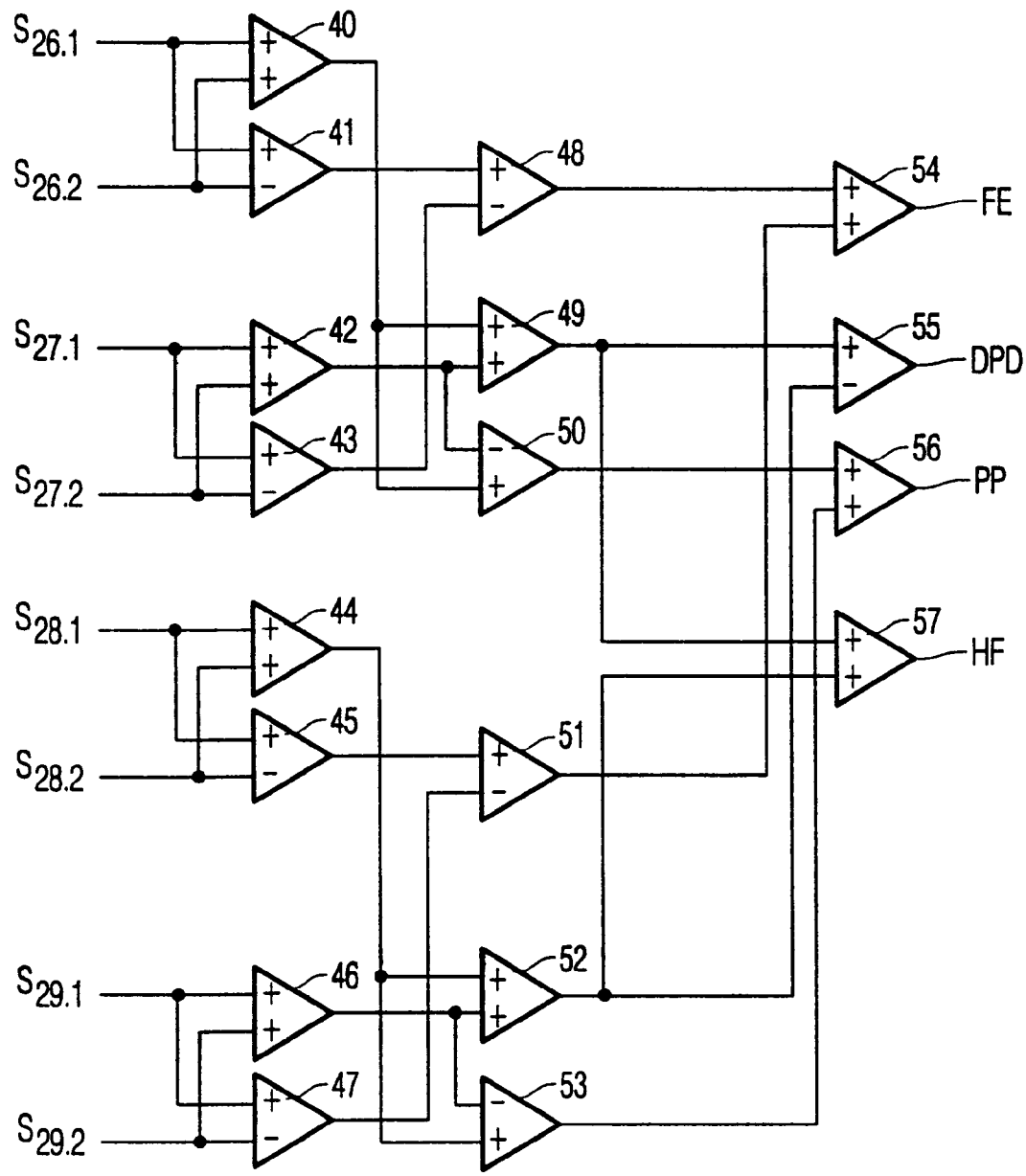
FIG. 4 shows an embodiment of the electric circuit of the detection system.

FIG. 4 shows an embodiment of the electric circuit of detection system 17 for forming information and error signals. A focus error signal $S_{FE}$ is formed using the four-fold Foucault method. A radial tracking error signal $S_{DPD}$ is formed using the differential phase detection method. This tracking error signal is useful when following tracks provided with information. Another radial tracking error signal $S_{PP}$ is formed using the push-pull method. The use of this tracking error signal is preferred when following tracks in which no information has yet been recorded. The information signal $S_{HF}$ represents the information recorded in the tracks. The information and error signals are formed from the detector signals according to the following equations, where $S_n$, is the detector signal of sub-detector n.

$S_{FE}=S_{26.1}-S_{26.2}-S_{27.1}+S_{27.2}+S_{28.1}-S_{28.2}-S_{29.1}-S_{29.2}$
$S_{DPD}=S_{26.1}+S_{26.2}+S_{27.1}+S_{27.2}-S_{28.1}-S_{28.2}-S_{29.1}-S_{29.2}$
$S_{PP}=S_{26.1}+S_{26.2}-S_{27.1}-S_{27.2}+S_{28.1}+S_{28.2}-S_{29.1}-S_{29.2}$
$S_{HF}=S_{26.1}+S_{26.2}+S_{27.1}+S_{27.2}+S_{28.1}+S_{28.2}+S_{29.1}+S_{29.2}$

As shown in FIG. 4, focus error signal $S_{FE}$ is formed by subtracters 41, 43, 45, 47, 48 and 51 and adder 54. Tracking error signal $S_{DPD}$ is formed by adders 40, 42, 44, 46, 49 and 52 and subtracter 55. Tracking error signal $S_{PP}$ is formed by adders 40, 42, 44, 46 and 56 and subtracters 50 and 53. Information signal $S_{HF}$ is formed by adders 40, 42, 44, 46, 49, 52 and 57.

Figure 5:
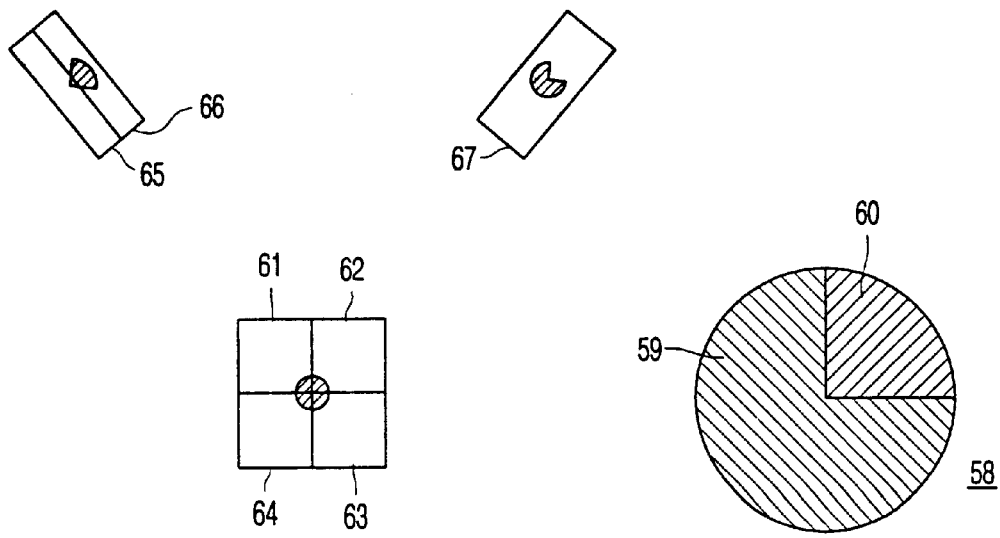
FIGS. 5, 6, 7 and 8 show top views of a dividing element and detectors.

FIG. 5 shows an embodiment of the dividing element and detectors wherein one of the sub-beams is used for the generation of the focus error signal. The dividing element 58 is provided with a grating structure. Three quadrants of the element 59 have a first grating structure, one quadrant 60 has a grating structure with a different direction of the grating lines. The zero-order sub-beams formed by dividing element 58 are incident on a detector having four quadrant-detectors 61–64. A first-order sub-beam from quadrant 58 is incident on a split detector having sub-detectors 65 and 66. A first-order beam formed by quadrants 59 is incident on a detector 67. A preferential diffraction of radiation mainly in sub-beams directed towards the detectors may be achieved by providing the grating structure with an appropriate blazing. The spots formed on the detectors by the quadrants of the dividing element are indicated by hatched areas. Dividing element 58 has been drawn to the right of detectors 61–64 instead of above them for clarity's sake. The direction of the tracks being scanned on the information layer corresponds to either the horizontal or vertical direction in the Figure. The output signals of sub-detectors 65 and 66 is used for generating a focus error signal $S_{FE}$. The output signals of detectors 61–64 are used for generating a radial error signal $S_{RE}$ by the differential phase-detection method. The information signal $S_{HF}$ is generated as the sum of the output signals of detectors 61–64, optionally with the addition of the output signals of detectors 65–67.

$S_{HF}=S_{61}+S_{62}+S_{63}+S_{64}$
$S_{FE}=S_{65}-S_{66}$
$S_{RE}=\Phi(S_{61}+S_{63}, S_{62}+S_{64})$, where $\Phi(a,b)$ indicates the phase difference between signals a and b.

Figure 6:
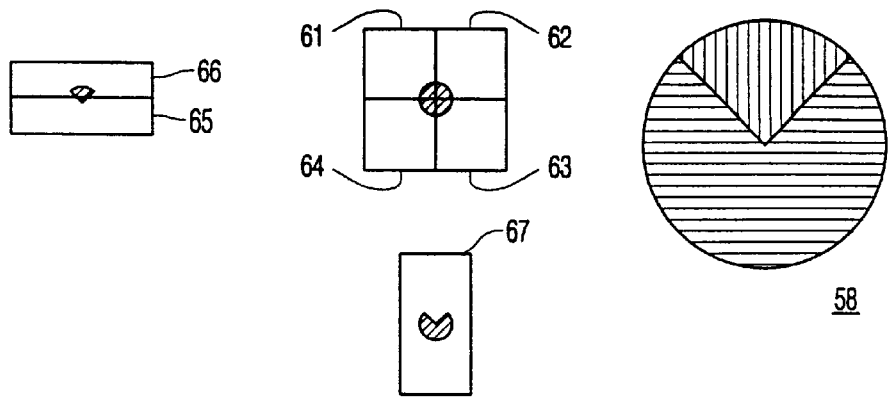

FIG. 6 shows an alternative arrangement of the dividing element and the detectors in which the radial-to-focus cross talk has been reduced. The direction of the tracks being scanned corresponds to the vertical direction in the Figure. The signals and their processing is the same as in the arrangement shown in FIG. 5.

Figure 7:
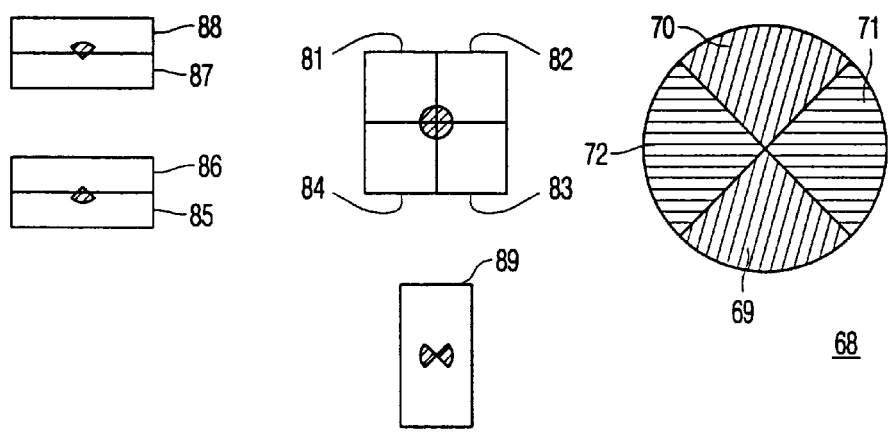

FIG. 7 shows another arrangement with reduced radial-to-focus cross talk. The direction of the tracks being scanned correspond to the vertical direction in the Figure. The focus error signal is generated by using sub-beams formed by two quadrants 69 and 70 of dividing element 68, incident on detectors 85, 86 and 87, 88, respectively. Sub-beams formed by quadrants 69 and 70 of dividing element 68 are incident on a detector 89. The information, focus error and radial error signals are then $S_{HF}=S_{81}+S_{82}+S_{83}+S_{84}$
$S_{FE}=S_{85}-S_{86}-S_{87}+S_{88}$
$S_{RE}=\Phi(S_{81}+S_{83}, S_{82}+S_{84})$.

In an alternative embodiment to the one shown in FIG. 7 the two groups of detectors 85, 86 and 87, 88 may be arranged on one line with the group of four detectors 81–84. In that case the gratings in sectors 69 and 70 have a different grating period.

Figure 8:
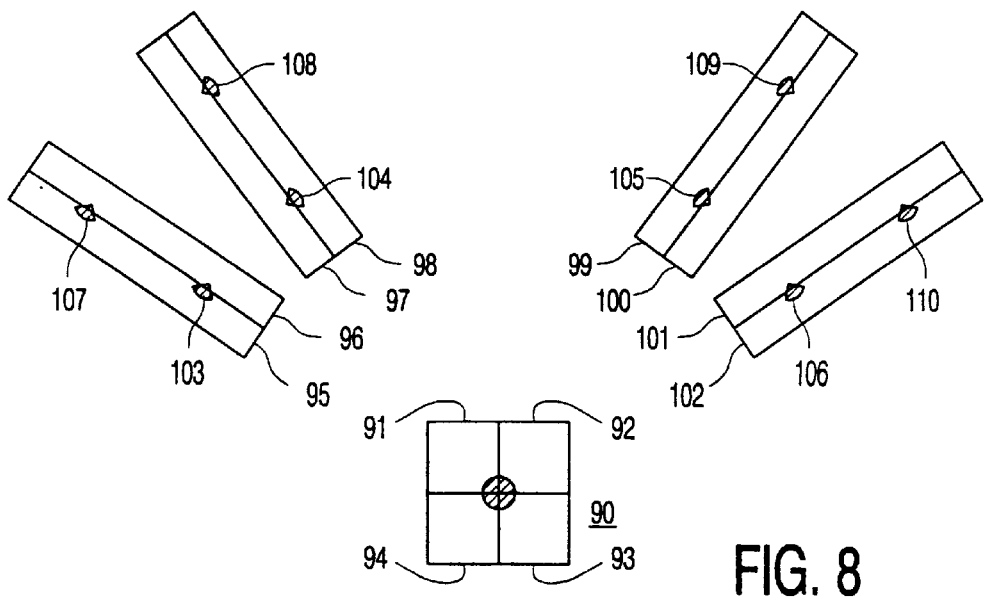

The detector arrangement where the spots move in the oblong direction of the detectors when the wavelength of the radiation changes due to a temperature change may also be used in a scanning device having a radiation source that can emit at two different wavelengths. The longer-wavelength radiation may be used for scanning record carriers having a relatively low information density, whereas the shorter-wavelength radiation may be used for scanning higher-density record carriers. The radiation source may comprise two closely-spaced semi-conductor lasers at the position of radiation source 5 in FIG. 1A. FIG. 8 shows a detector configuration located at the position of detectors 15 and 17 in FIG. 1A. The dividing element has the same lay-out as dividing element 13 in FIG. 2. Longer-wavelength radiation is diffracted under a smaller angle by the dividing element than shorter-wavelength radiation. Quadrant detector 90 having four detectors 91–94 receives the zeroth-order sub-beam of the dividing element. Four split detectors having sub-detectors 95 to 102 correspond to the four split detectors 26 to 29 having sub-detectors 26.1 to 29.2. The length of the sub-detectors in FIG. 8 is longer than that of the sub-detectors in FIG. 2. The spots formed by the quadrants of the dividing element on the sub-detectors when using the longer-wavelength radiation are indicated by 103 to 106. The spots formed when using the shorter-wavelength radiation are indicated by 107 to 110. The spot of the zero-order sub-beam on quadrant detector 90 does not displace when the wavelength changes. The increased length of the sub-detectors does not affect the performance of the scanning device, because the longer sub-detectors do not capture more stray light and aberrated rays due to the inventive orientation of the dividing element and detectors. The output signals of the detectors 91–102 may be processed in the same way as the output signals of the detectors in FIG. 2.

In an alternative embodiment of the detectors shown in FIG. 8, each of the detectors 95–102 may be divided in two separate detectors, one for each wavelength, giving a total of eight split detectors. The two radiation sources may be arranged at the position of radiation source 5 in FIG. 1B. Alternatively, one radiation sources may be arranged at the position of radiation source 5 and one at the position of detector 15 in FIG. 1A. The detectors and/or the radiation source may be mounted in a single enclosure, with the dividing element preferably fixed to the enclosure. It will be clear that the detector configurations shown in FIGS. 5, 6 and 7 may likewise be adapted for two-wavelength use.

The preferred size of the radiation-sensitive surfaces of detectors is given in European patent application no. 763

236 for a scanning device which can scan record carriers having different substrate thicknesses.

What is claimed is:

1. A device for optically scanning an information plane, which device comprises a radiation source for supplying a scanning beam, an objective system for focusing the scanning beam to a scanning spot on the information plane, a dividing element comprising at least one sector having an included arc equal to or smaller than 120° arranged in the optical path of the radiation from the information plane for splitting at least a part of said radiation into a sub-beam, and a radiation-sensitive detection system comprising an oblong detector for receiving the sub-beam, characterized in that the direction of the longest dimension of the detector is substantially perpendicular to the bisector of the sector of the dividing element, and wherein the angle between the bisector and the direction of the longest dimension is within the range from 75° to 105°.

2. Device according to claim 1, wherein the detector comprises two sub-detectors located symmetrically at both sides of a dividing line, the dividing line being substantially parallel to the direction of the longest dimension of the detector.

3. Device according to claim 2, wherein the sector of the dividing element is provided with grating lines and the direction of the grating lines and the dividing line are substantially perpendicular.

4. Device according to claim 1, wherein the detector has a width in the direction of the bisector of the appertaining sector in a range from 4 to 8 times $\lambda/NA$, where $\lambda$ is the wavelength of the radiation and NA is the numerical aperture of the beam incident on the detector.

5. Device according to claim 1, wherein the dividing element comprises four sectors, each having an included angle of 90°, and the radiation-sensitive detection system comprises four oblong detectors each for receiving a sub-beam formed by an appertaining sector, the direction of the longest dimension of each detector being substantially perpendicular to the bisector of the appertaining sector.

6. Device according to claim 1, which comprises a detection circuit connected to the detection system for providing an information signal representing information stored in the information plane, and an error-correction circuit for correcting errors in the information signal.

* * * * *